United States Patent
Saiwai et al.

(10) Patent No.: US 11,197,220 B2
(45) Date of Patent: Dec. 7, 2021

(54) RADIO TERMINAL, COMMUNICATION DEVICE, AND BASE STATION

(71) Applicant: KYOCERA CORPORATION, Kyoto (JP)

(72) Inventors: Takahiro Saiwai, Yokohama (JP); Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/072,613

(22) PCT Filed: Jan. 13, 2017

(86) PCT No.: PCT/JP2017/001067
§ 371 (c)(1),
(2) Date: Jul. 25, 2018

(87) PCT Pub. No.: WO2017/130743
PCT Pub. Date: Aug. 3, 2017

(65) Prior Publication Data
US 2019/0037466 A1   Jan. 31, 2019

(30) Foreign Application Priority Data
Jan. 26, 2016   (JP) .............................. JP2016-012326

(51) Int. Cl.
*H04W 84/00*   (2009.01)
*H04W 84/04*   (2009.01)
(Continued)

(52) U.S. Cl.
CPC ........... *H04W 36/30* (2013.01); *H04L 1/0026* (2013.01); *H04W 24/10* (2013.01); *H04W 48/10* (2013.01);
(Continued)

(58) Field of Classification Search
CPC ..... H04W 36/30; H04W 36/42; H04W 36/00; H04W 76/14; H04W 76/10; H04W 76/00;
(Continued)

(56) References Cited

U.S. PATENT DOCUMENTS 9,019,861 B2   4/2015   Matsuo et al.
9,037,075 B2   5/2015   Takano et al.
(Continued)

FOREIGN PATENT DOCUMENTS

| JP | 2011-193375 A | 9/2011 |
| JP | 2013-078061 A | 4/2013 |
| WO | 2012/035697 A1 | 3/2012 |

OTHER PUBLICATIONS

Samsung, RAN2 Aspects for supporting ProSe Discovery in Partial & OOC, May 25-29, 2015 (Year: 2015).*
(Continued)

*Primary Examiner* — Jeffrey M Rutkowski
*Assistant Examiner* — Luna Weissberger
(74) *Attorney, Agent, or Firm* — Studebaker & Brackett PC

(57) ABSTRACT

A radio terminal according to one embodiment comprises a receiver configured to receive from a moving cell, identification information identifying the moving cell. The moving cell is managed by a movable communication device and moves along movement of the communication device. The receiver receives the identification information in a sidelink that is a direct radio link in a Proximity service.

9 Claims, 10 Drawing Sheets

(51) Int. Cl.
| | |
|---|---|
| *H04W 36/30* | (2009.01) |
| *H04W 92/18* | (2009.01) |
| *H04W 48/10* | (2009.01) |
| *H04W 76/14* | (2018.01) |
| *H04L 1/00* | (2006.01) |
| *H04W 24/10* | (2009.01) |
| *H04W 56/00* | (2009.01) |
| *H04W 92/10* | (2009.01) |
| *H04L 5/00* | (2006.01) |

(52) U.S. Cl.
CPC ......... *H04W 56/001* (2013.01); *H04W 76/14* (2018.02); *H04W 84/00* (2013.01); *H04W 92/10* (2013.01); *H04W 92/18* (2013.01); *H04L 5/00* (2013.01); *H04W 84/005* (2013.01)

(58) Field of Classification Search
CPC . H04W 24/10; H04W 24/00; H04W 56/0015; H04W 56/00; H04W 92/10; H04W 92/08; H04W 92/02; H04W 92/00; H04W 84/005; H04W 84/00; H04W 48/10; H04W 48/08; H04W 48/00; H04W 92/18; H04W 92/16; H04L 1/0026; H04L 1/0023; H04L 1/0001; H04L 5/00
USPC .......................................................... 370/329
See application file for complete search history.

(56) References Cited

U.S. PATENT DOCUMENTS

| | | | | |
|---|---|---|---|---|
| 2014/0341188 A1* | 11/2014 | Chang | ..................... | H04W 4/06 370/331 |
| 2015/0009908 A1 | 1/2015 | Kalapatapu et al. | | |
| 2015/0065136 A1* | 3/2015 | Lee | ................... | H04W 36/0061 455/436 |
| 2015/0131613 A1* | 5/2015 | Jung | ................ | H04W 36/0007 370/331 |
| 2018/0167790 A1* | 6/2018 | Cavalcanti | .......... | H04L 63/0281 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN) 3GPP TS36.300 V13.1.0; Sep. 2015; pp. 1-254; Release 13; 3GPP Organizational Partners.

LG Electronics Inc.; "Further Discussion on V2X Scenarios"; 3GPP TSG-RAN WG2 #92; R2-156512; Nov. 16-20, 2015; pp. 1-5; Anaheim, CA, USA.

Samsung; "Key Issue Update for V2X UE Identification"; SA WG2 Meeting #113; S2-160428; Jan. 25-29, 2016; pp. 1-3; Saint Kitts, KN.

LG Electronics; "Discussion on Remaining Issue Related to LS from RAN2 on ProSe UE-to-Network Relay"; SA WG2 Meeting #112; S2-153887; Nov. 16-20, 2015; pp. 1-3; Anaheim, CA, USA.

Qualcomm Incorporated et al.; "D2D Tx Requirements: MPR for SSSS"; 3GPP TSG-RAN WG4 #74; R4-151254; Feb. 9-13, 2015; pp. 1-7; Athens, Greece.

Samsung; "RAN2 Aspects for Supporting ProSe Discovery in Partial & OOC"; 3GPP TSG-RAN WG2 #90; R2-152143; May 25-29, 2015; pp. 1-4; Fukuoka, Japan.

* cited by examiner

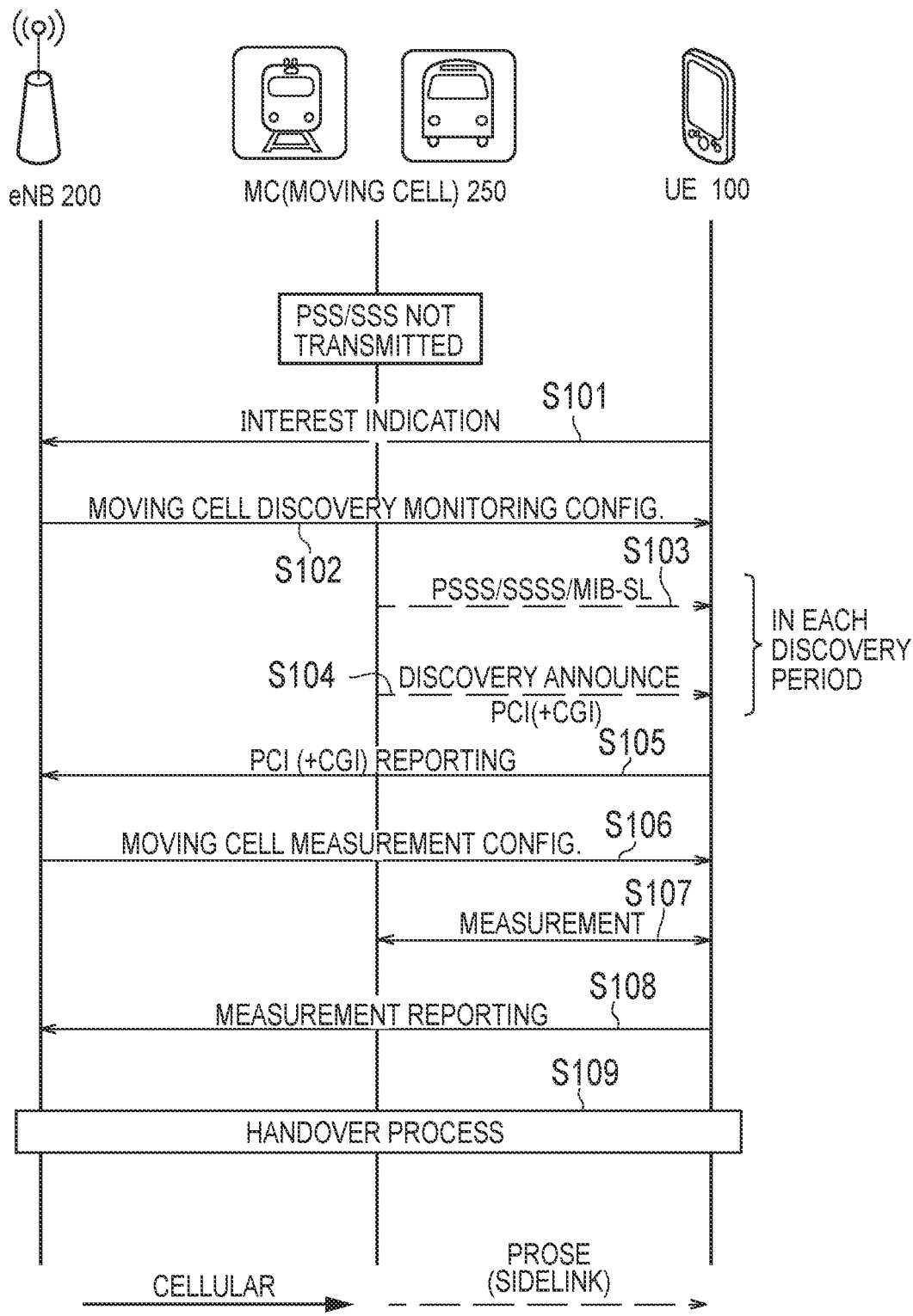

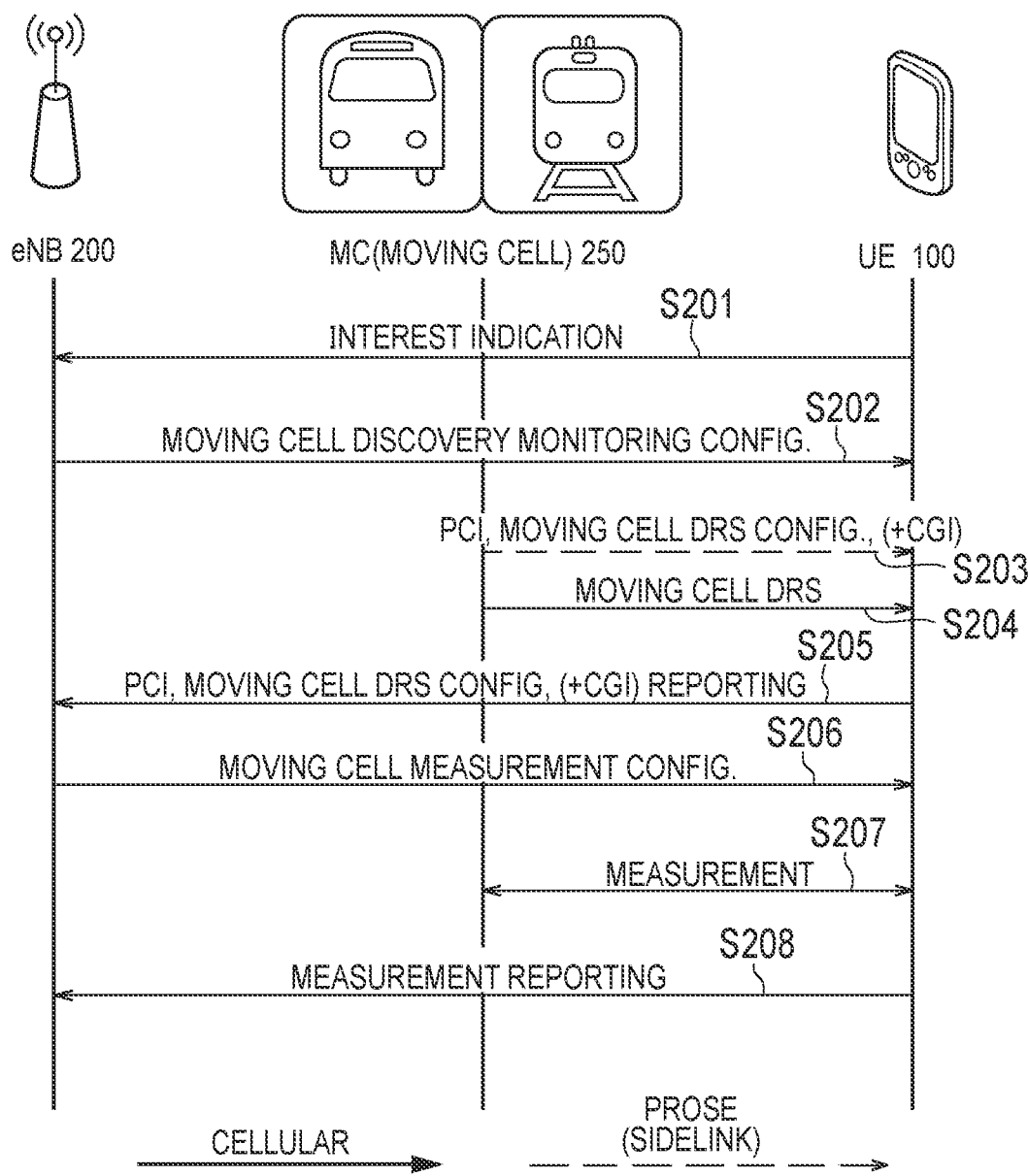

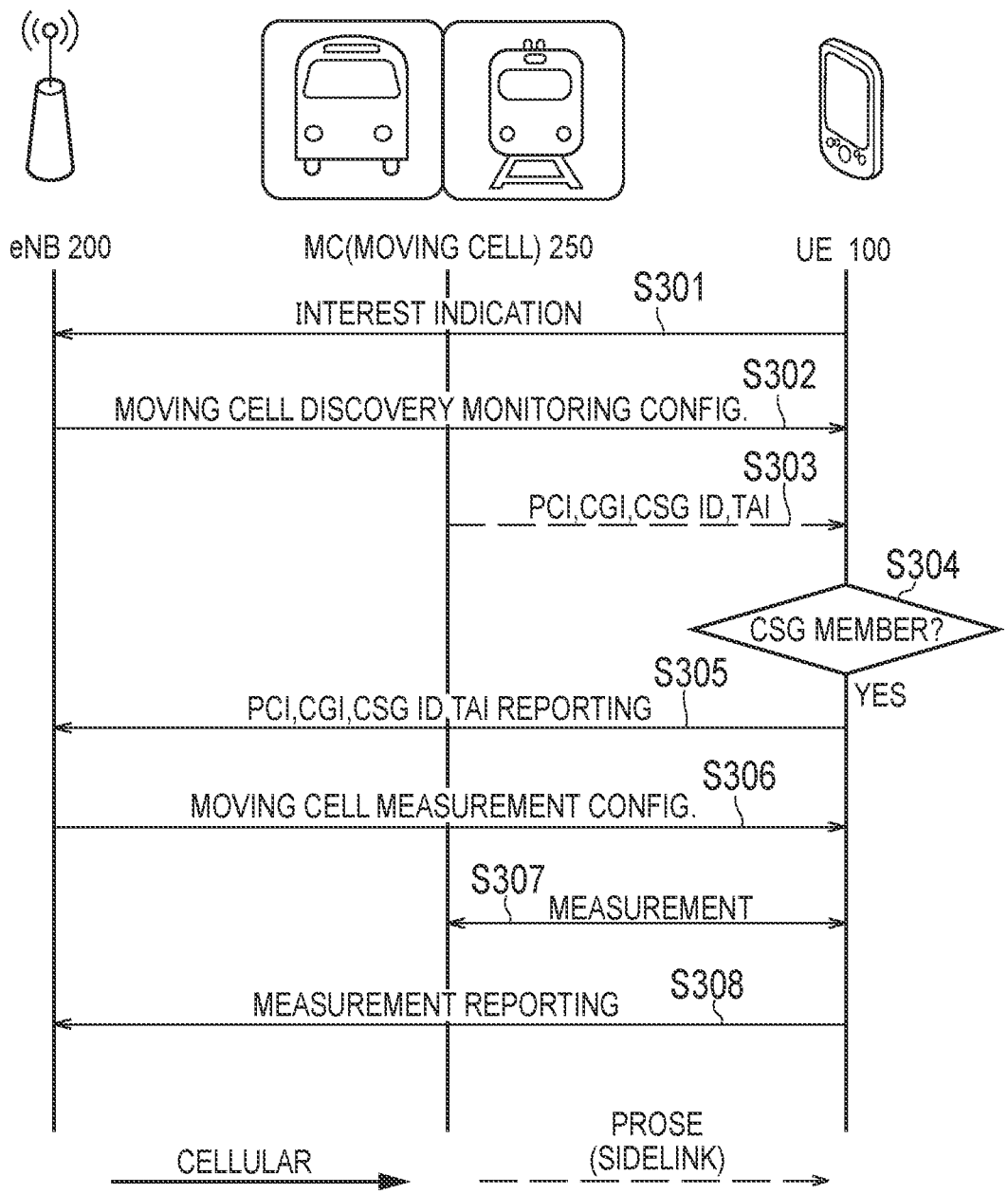

RADIO TERMINAL, COMMUNICATION DEVICE, AND BASE STATION

TECHNICAL FIELD

The present application relates to a radio terminal, a communication device, and a base station used in a communication system.

BACKGROUND ART

In 3GPP (3rd Generation Partnership Project), which is a project aiming to standardize a mobile communication system, specifications are being designed to enhance LTE (Long Term Evolution) (for example, see Non Patent Document 1).

In recent years, to respond to a rapidly increasing traffic demand, for example, it is considered that a train or a bus or public transportation is equipped with a communication device configured to manage a cell. The cell managed by the communication device may be referred to as "moving cell (Moving Cell)" because the cell moves along with movement of the communication device.

A procedure in which a radio terminal connects to (accesses to) the moving cell (communication device) has not been prepared in a specification.

PRIOR ART DOCUMENT

Non-Patent Document

Non Patent Document 1: 3GPP technical specification "TS 36.300 V13.1.0" Sep. 24, 2015

SUMMARY

A radio terminal according to one embodiment comprises a receiver configured to receive from a moving cell, identification information identifying the moving cell. The moving cell is managed by a movable communication device and moves along movement of the communication device. The receiver receives the identification information in a sidelink that is a direct radio link in a Proximity service.

A communication device according to one embodiment is movable. The communication device comprises a controller configured to manage a moving cell moving along movement of the communication device; and a transmitter configured to transmit identification information for identifying the moving cell. The transmitter transmits the identification information via a sidelink that is a direct radio link in a proximity service.

A base station according to one embodiment comprises a receiver configured to receive, from a radio terminal that has received identification information for identifying a moving cell in a sidelink that is a direct radio link in a proximity service, the identification information; and a transmitter configured to transmit, based on the identification information, configuration information for measuring a radio signal from the moving cell, to the radio terminal.

BRIEF DESCRIPTION OF THE DRAWINGS

FIG. 6 is a sequence chart for describing an operation according to a first embodiment.

FIG. 7 is a sequence chart for describing an operation according to a second embodiment.

FIG. 13 is a sequence chart for describing an operation according to a third embodiment.

DESCRIPTION OF THE EMBODIMENT

Overview of Embodiment

Figure 1:
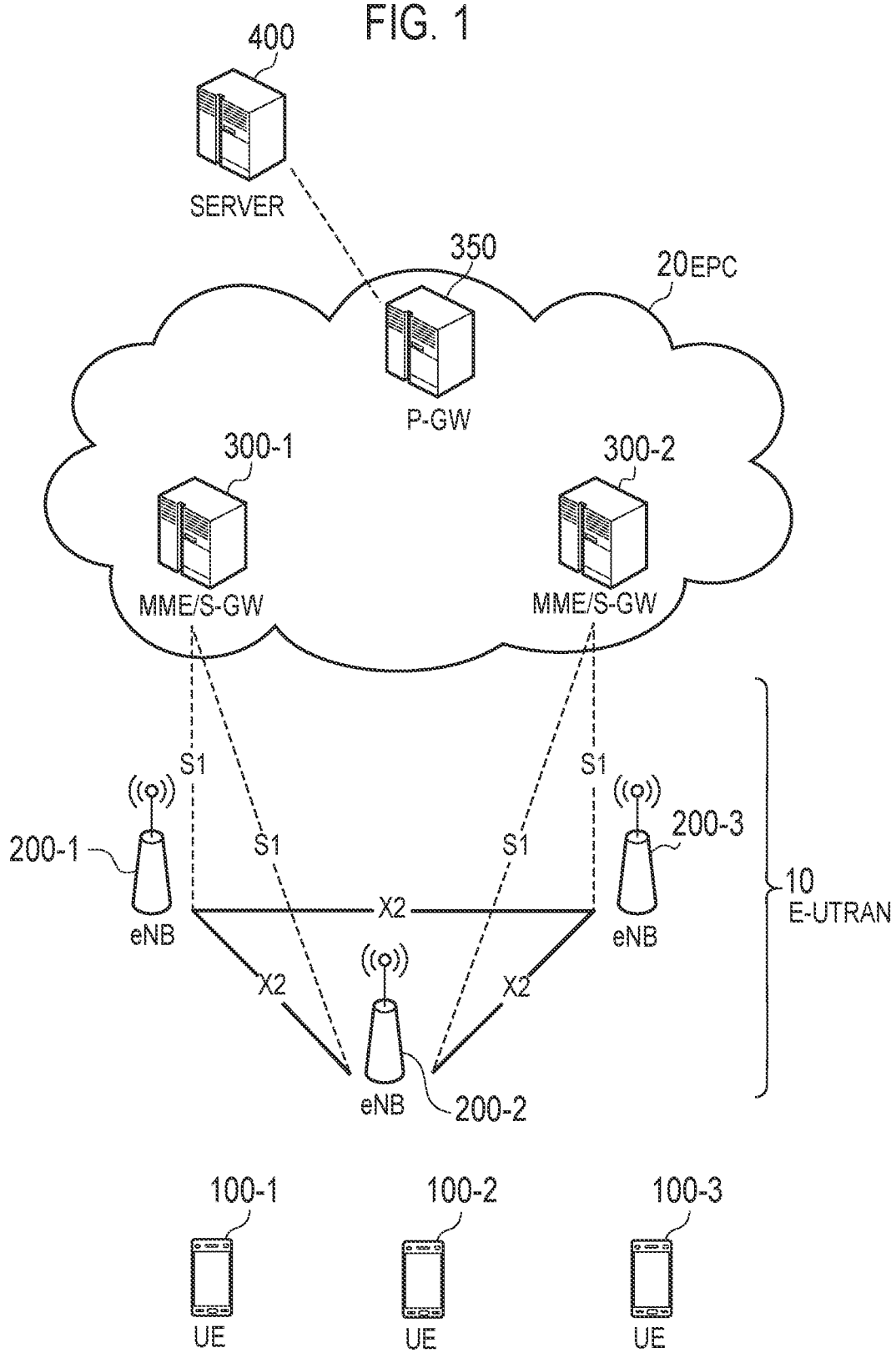
FIG. 1 is a diagram illustrating a configuration of an LTE system.

If a radio terminal connects to a moving cell according to the same procedure as an existing cell (general cell) managed by a base station, there may be various problems.

A radio terminal according to one embodiment comprises a receiver configured to receive from a moving cell, identification information identifying the moving cell. The moving cell is managed by a movable communication device and moves along movement of the communication device. The receiver is configured to receive the identification information in a sidelink that is a direct radio link in a Proximity service.

The radio terminal may further comprise a controller configured to control a measurement on a radio signal from the moving cell, based on the identification information.

The receiver may receive a special synchronization signal in the sidelink, from the moving cell. The radio terminal may further comprise a controller configured to establish synchronization with the moving cell, based on the special synchronization signal.

The receiver may receive from the moving cell a special synchronization signal transmitted by a manner different from a manner for a synchronization signal in a downlink. The radio terminal may further comprise a controller configured to establish synchronization with the moving cell, based on the special synchronization signal.

The special synchronization signal may be different in transmission pattern from the synchronization signal.

The radio terminal may further comprise a transmitter configured to transmit an indication indicating that the radio terminal is interested in connection to a moving cell, before receiving the identification information, to a base station configured to manage a serving cell of the radio terminal. The receiver may further receive from the base station information for receiving the identification information in response to transmission of the indication.

The radio terminal may further comprise a transmitter configured to transmit the identification information to a base station configured to manage a serving cell of the radio terminal. The receiver may further receive from the base station, in response to transmission of the identification information, configuration information for measuring a radio signal from the moving cell.

The radio terminal may further comprise a controller configured to measure a reference signal from the moving cell, based on the configuration information. The transmitter may transmit a measurement result of the reference signal to the base station. The reference signal may be a reference signal in the downlink or a reference signal in the sidelink.

The radio terminal may further comprise a transmitter configured to transmit an indication indicating that the radio terminal is interested in connection to a moving cell, before receiving the identification information, to a base station configured to manage a serving cell of the radio terminal. The transmitter may transmit the indication, only if the radio terminal is accessible to the moving cell.

A communication device according to one embodiment is movable. The communication device comprises a controller configured to manage a moving cell moving along movement of the communication device; and a transmitter configured to transmit identification information for identifying the moving cell. The transmitter transmits the identification information via a sidelink that is a direct radio link in a proximity service.

The transmitter may transmit a special synchronization signal in the sidelink, without transmitting a synchronization signal in a downlink. The special synchronization signal may be a signal for establishing, by a radio terminal, synchronization with the moving cell.

The transmitter may transmit a special synchronization signal by a manner different from a manner for a synchronization signal in the downlink. The special synchronization signal may be a signal for establishing, by a radio terminal, synchronization with the moving cell.

The transmitter may transmit the special synchronization signal by a manner different in transmission pattern from the synchronization signal.

A base station according to one embodiment comprises a receiver configured to receive, from a radio terminal that has received identification information for identifying a moving cell in a sidelink that is a direct radio link in a proximity service, the identification information; and a transmitter configured to transmit, based on the identification information, configuration information for measuring a radio signal from the moving cell, to the radio terminal.

The receiver may receive, before receiving the identification information, an indication indicating that the radio terminal is interested in connecting to the moving cell, from the radio terminal. The transmitter may transmit, in response to reception of the indication, information for receiving the identification information, to the radio terminal.

The receiver may receive, from the radio terminal, a measurement result of a reference signal in the sidelink, from the moving cell. The base station may further comprise a controller configured to determine, based on the measurement result, whether to perform handover of the radio terminal to the moving cell. The reference signal may be a reference signal in the downlink or a reference signal in the sidelink.

(Mobile Communication System)

A LTE system that is the mobile communication system according to the embodiment will be described. FIG. 1 is a diagram illustrating a configuration of the LTE system.

As illustrated in FIG. 1, the LTE system includes a User Equipment (UE) 100, an Evolved-Universal Terrestrial Radio Access Network (E-UTRAN) 10, and an Evolved Packet Core (EPC) 20. Furthermore, a server 400 is provided in an external network that is not managed by an operator of the cellular network.

The UE 100 corresponds to a radio terminal. The UE 100 is a mobile communication apparatus and performs radio communication with a cell (serving cell). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells, and performs radio communication with the UE 100 that has established connection with the own cells. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 includes a Mobility Management Entity (MME)/Serving-Gateway (S-GW) 300 and a Packet data network Gateway (P-GW) 350. The MME performs various types of mobility control for the UE 100, and the like. The S-GW performs transfer control of data. The MME/S-GW 300 is connected with the eNB 200 via an S1 interface. The E-UTRAN 10 and the EPC 20 configure a network. The P-GW 350 performs control to relay user data from the external network (and to the external network).

The Server 400 is, for example, a ProSe application server (ProSe Application Server). In this case, the Server 400 manages identifiers used in ProSe. For example, the Server 400 stores "EPC ProSe user ID" and "ProSe function ID". Further, the Server 400 maps "application layer user ID" and "EPC ProSe user ID".

Further, the Server 400 may have the ProSe function. The ProSe function is a logical function used for network related operation required for ProSe. The ProSe function plays a different role for each feature of ProSe. The Server 400 may be a network device having only the ProSe function.

Figure 2:
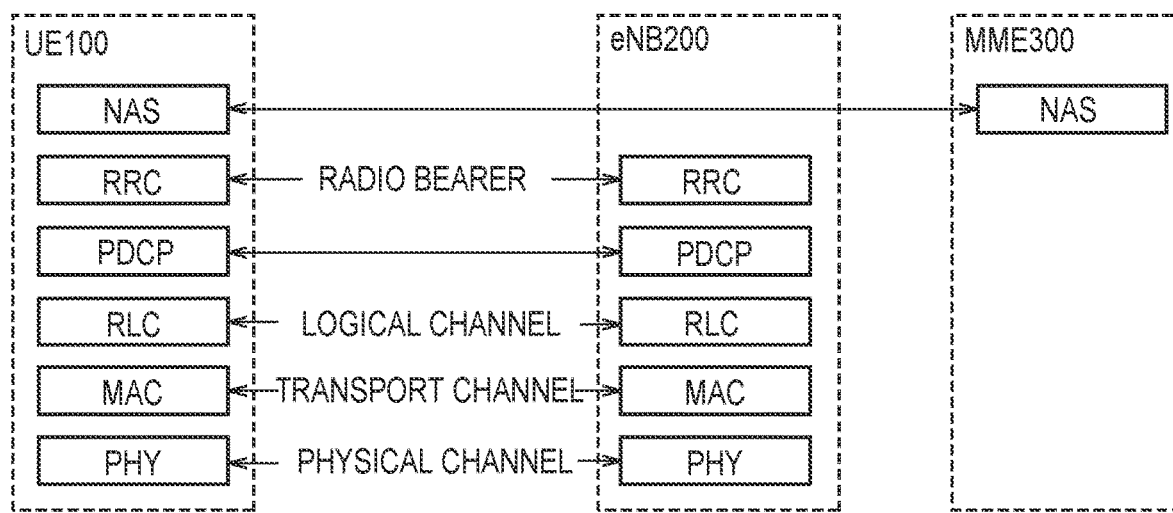
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler. The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control signal are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is a connection (RRC connection) between the RRC of the UE 100 and the RRC of the eNB 200, the UE 100 is in an RRC connected state (connected state), otherwise the UE 100 is in an RRC idle state (idle state).

A non-access stratum (NAS) layer located above the RRC layer performs session management, mobility management, and the like.

Figure 3:
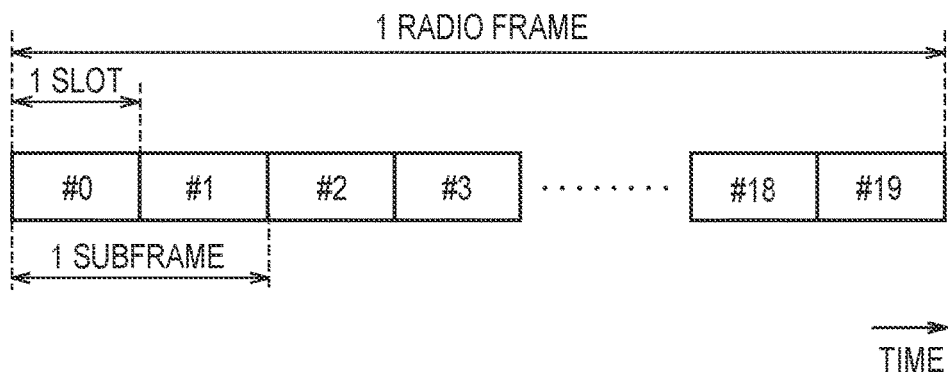
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. In addition, among radio resources (time/frequency resources) to be allocated to the UE 100, a frequency resource can be identified by resource blocks and a time resource can be identified by subframes (or slots).

In downlink, a section corresponding to beginning several symbols of each subframe is a region used as a physical downlink control channel (PDCCH) for transferring mainly downlink control signal. The details of the PDCCH will be described later. In addition, a remaining part of each subframe is a region that can be used as a physical downlink shared channel (PDSCH) for transferring mainly downlink data.

In uplink, both end portions in the frequency direction of each subframe are regions used as a physical uplink control channel (PUCCH) for transferring mainly uplink control signal. A remaining part of each subframe is a region that can be used as a physical uplink shared channel (PUSCH) for transferring mainly uplink data.

(Proximity Service)

In the description that follows, "ProSe (Proximity Services) will be described. In the ProSe, a plurality of UEs 100 transmit and receive various types of signals via a direct radio link not passing through the eNB 200. The ProSe is referred to as "Sidelink".

The "Sidelink" is a UE-to-UE interface for direct discovery and direct communication. The "Sidelink" corresponds to a PC5 interface. The PC5 is a reference point between UEs capable of utilizing the proximity service, where the reference point is used for a control and user plane for UE-to-Network relay based on direct discovery, direct communication, and proximity service. The PC5 interface is a UE-to-UE interface in the ProSe.

Two modes, namely, "direct discovery (Direct Discovery)" and "direct communication (Direct Communication)", are defined for modes of the ProSe.

The direct discovery is a mode of searching a partner destination by directly transmitting, between UEs, a discovery signal that does not specify a specific destination. Further, the direct discovery is a procedure for discovering another UE in the proximity of a UE by using a direct radio signal in E-UTRA (Evolved Universal Terrestrial Radio Access) via the PC5. Alternatively, the direct discovery is a procedure adopted by a UE 100 capable of executing the proximity service for discovering another UE 100 capable of executing the proximity service by using only the capability of the two UEs 100 with the help of the E-UTRA technology. The direct discovery is supported only if the service is provided to the UE 100 by the E-UTRAN (eNB 200 (cell)). The UE 100 may receive the service by the E-UTRAN if the UE 100 is either connected to the cell (eNB 200) or exists in the cell.

As a resource allocation type for the transmission (announcement) of a discovery signal (discovery message), there are "Type 1" in which the UE 100 selects a radio resource, and "Type 2 (Type 2B)" in which the eNB 200 allocates the radio resource.

A "Sidelink Direct Discovery" protocol stack includes a physical (PHY) layer, a MAC layer, and a ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between UEs by specifying a specific destination (destination group). Further, the direct communication is communication between two or more UEs capable of executing the proximity service by user plane transmission using the E-UTRA technology via a path not passing through any network node.

As a resource allocation type of the direct communication, there are "Mode 1" in which the eNB 200 specifies a radio resource of the direct communication, and "Mode 2" in which the UE 100 selects a radio resource of the direct communication.

A direct communication protocol stack includes a physical (PHY) layer, a MAC layer, an RLC layer, and a PDCP layer. Between the physical layer of a UE (A) and the physical layer of a UE (B), a control signal is transmitted via a physical sidelink control channel (PSCCH), and data is transmitted via a physical sidelink shared channel (PSSCH). Further, a synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

Further, the "Sidelink" may not only be the UE-to-UE interface but also an interface between the communication device and the UE, described later. Accordingly, when the "proximity service" is described, the "UE" may be replaced by the "communication device (moving cell)" described below. It is noted that the direct radio link in the ProSe may be referred to as "Sidelink".

(Radio Terminal)

Figure 4:
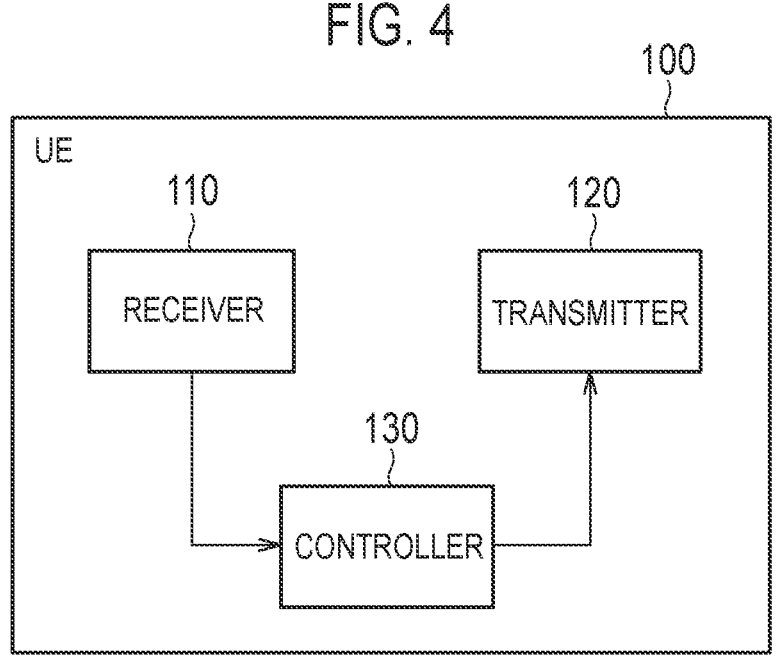
FIG. 4 is a block diagram of a UE 100.

The UE 100 (radio terminal) according to the embodiment will be described below. FIG. 4 is a block diagram of the UE 100. As illustrated in FIG. 4, the UE 100 includes a receiver 110, a transmitter 120, and a controller 130. The receiver 110 and the transmitter 120 may be unified as one in the form of a transceiver (transmission and reception unit).

The receiver 110 performs various types of receptions under the control of the controller 130. The receiver 110 includes an antenna. The receiver 110 converts a radio signal received by the antenna into a baseband signal (received signal), and outputs the baseband signal to the controller 130.

It is noted that if the UE 100 is a "ProSe-enabled Public Safety UE", the receiver 110 can simultaneously receive radio signals in two different frequencies. For example, the UE 100 has two receivers 110 (2 RX Chains). The UE 100 can receive a cellular radio signal by one receiver 110, and receive a ProSe radio signal by the other receiver 110.

The transmitter 120 performs various types of transmissions under the control of the controller 130. The transmitter 120 includes an antenna. The transmitter 120 converts a baseband signal (transmission signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various types of processes by executing the program stored in the memory. The processor may include a codec that performs encoding and decoding on sound and video signals. The processor executes various types of processes described later, and various types of communication protocols described above.

The UE 100 may include a GNSS receiving equipment. The GNSS receiving equipment receives a GNSS signal in order to obtain location information indicating a geographical location of the UE 100, and outputs the received signal to the controller 130. Alternatively, the UE 100 may have a GPS function for obtaining the location information of the UE 100.

It is noted that a below-described process (operation) executed by the UE 100 is executed by at least any one of the receiver 110, the transmitter 120, and the controller 130 included in the UE 100; however, for simplicity, description is given assuming that the process is executed by the UE 100.

(Base Station)

Figure 5:
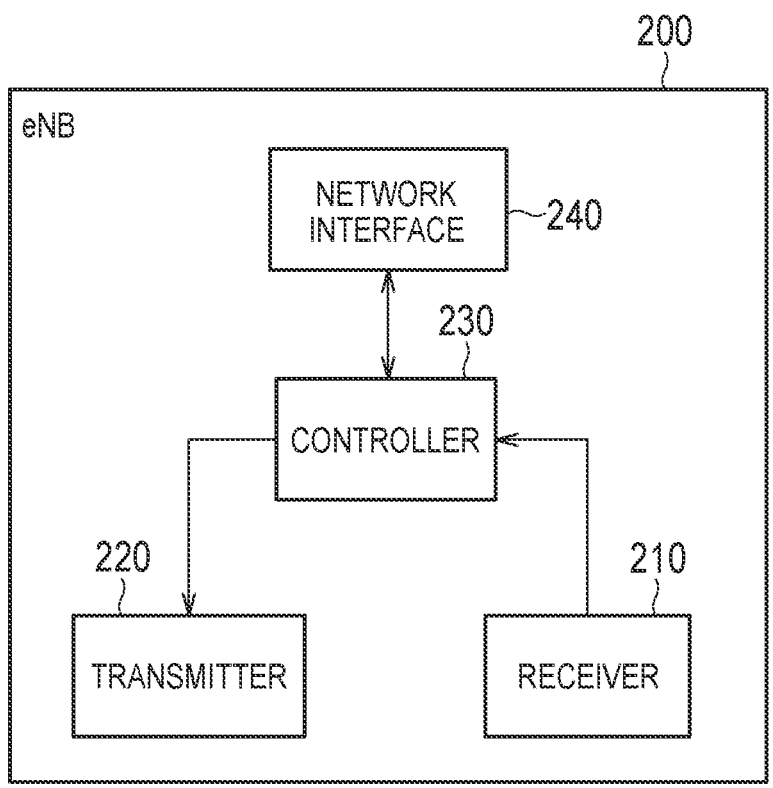
FIG. 5 is a block diagram of an eNB 200.

The eNB 200 (base station) according to the embodiment will be described below. FIG. 5 is a block diagram of the eNB 200. As illustrated in FIG. 5, the eNB 200 includes a receiver 210, a transmitter 220, a controller 230, and a network interface 240. The transmitter 210 and the receiver 220 may be unified as one in the form of a transceiver (transmission and reception unit).

The receiver 210 performs various types of receptions under the control of the controller 230. The receiver 210 includes an antenna. The receiver 210 converts a radio signal received by the antenna into a baseband signal (reception signal), and outputs the baseband signal to the controller 230.

The transmitter 220 performs various types of transmissions under the control of the controller 230. The transmitter 220 includes an antenna. The transmitter 220 converts a baseband signal (transmission signal) output from the controller 230 into a radio signal, and transmits the radio signal from the antenna.

The controller 230 performs various types of controls in the eNB 200. The controller 230 includes a processor and a memory. The memory stores a program to be executed by the processor, and information to be used for a process by the processor. The processor includes a baseband processor configured to perform modulation and demodulation, encoding and decoding and the like of a baseband signal, and a CPU (Central Processing Unit) configured to perform various types of processes by executing the program stored in the memory. The processor executes various types of processes described later, and various types of communication protocols described above.

The network interface 240 is connected to a neighbour eNB 200 via the X2 interface and is connected to the MME/S-GW 300 via the S1 interface. The network interface 240 is used in communication performed on the X2 interface, communication performed on the S1 interface, and the like.

It is noted that the below-described process (operation) executed by the eNB 200 is executed by at least any one of the transmitter 210, the receiver 220, the controller 230, and the network interface 240 included in the eNB 200; however, for simplicity, description is given assuming that the process is executed by the eNB 200.

(Communication Device)

The communication device according to the embodiment will be described, below. In the present embodiment, the communication device manages the moving cell. The communication device is capable of moving. For example, the communication device is installed in a movable vehicle (for example, train, bus, or the like). The communication device may be capable of moving as a result of the vehicle moving. Further, the communication device may be capable of moving as a result of the communication device itself moving.

The moving cell is managed by a movable communication device. Further, the moving cell is a cell moving along with movement of the communication device. It is noted that an existing cell managed by the eNB 200 basically not capable of moving is referred to as "general cell", where appropriate. The general cell is a cell that does not move.

As in the block diagram of the UE 100, described above, the communication device may include a receiver, a transmitter, and a controller. Alternatively, as in the block diagram of the eNB 200, the communication device may further include a network interface in addition to the receiver, the transmitter, and the controller. The network interface may be connected, by radio, to the neighbour eNB 200 via the X2 interface, and may be connected to the MME/S-GW 300 via the S1 interface.

In the present embodiment, by the transmitter, the communication device (mobile cell) can transmit not only the radio signal in the downlink but also the radio signal in the sidelink (sidelink signal). If including the same function as the UE, the communication device may be capable of transmitting, as the UE, the radio signal in the sidelink. Further, the communication device may be capable of transmitting, as the cell, the radio signal in the sidelink.

It is noted that a process (operation) executed by the communication device may be described as a process (operation) executed by the moving cell. It is noted that the below-described process (operation) executed by the communication device (moving cell) is executed by at least any one of the transmitter, the receiver, the controller, and the network interface included in the communication device; however, for simplicity, this process is described as a process executed by the communication device (moving cell).

First Embodiment

Next, an operation according to a first embodiment will be described by using FIG. 6. FIG. 6 is a sequence chart for describing an operation according to the first embodiment.

In FIG. 6, the UE 100 exists in a cell (serving cell) managed by an eNB 200-1. In the serving cell, the UE 100 is in an idle state or a connected state. It is noted that if existing in the cell, the UE 100 is in a state capable of receiving a radio signal from the cell (eNB).

A case is assumed where along with the movement of the communication device configured to manage a moving cell (MC) 250, the UE is located in the MC 250. The MC 250 at least partially overlaps with the cell of the eNB 200. The MC 250 may be smaller than the cell of the eNB 200.

As illustrated in FIG. 6, the MC 250 (communication device) does not transmit a synchronization signal (PSS (Primary Synchronization Signal)/SSS (Secondary Synchronization signal)) in a downlink transmitted in a normal cell. Thus, it is possible to prevent connection of the UE 100 not interested in connecting to MC 250. Further, if the MC 250 transmits the synchronization signal in the downlink, interference may occur, and collision/confusion of the physical layer cell identifier may be generated, along with the movement of the MC 250. If the MC 250 does not transmit the synchronization signal in the downlink, it is possible to suppress the interference and the collision/confusion of the physical layer cell identifier.

In step S101, the UE 100 transmits an interest indication indicating that the UE 100 is interested in connecting to the MC 250, to the eNB 200 (serving cell).

The UE 100 may transmit, based on an operation from the user, the interest indication to the eNB 200. Further, the UE 100 may transmit the interest indication to the eNB 200 depending on an environment (for example, a radio environment) of the UE 100. For example, the UE 100 may transmit the interest indication to the eNB 200, if riding on a vehicle. If being interested in connecting to the MC 250 and being connectable to the MC 250, the UE 100 may transmit the interest indication to the eNB 200. If receiving the radio signal (for example, a radio signal including a below-described special synchronization signal and/or below-described identification information) from the MC 250 (if discovering the MC 250), the UE 100 may determine that it is possible to connect to the MC 250. The UE 100 may include an intention that the UE 100 desires to connect to the MC 250, into the interest indication.

The eNB 200 receives the interest indication from the UE 100. The eNB 200 can execute a process of step S102 if receiving the interest indication.

In step S102, the eNB 200 transmits monitor information (Moving cell discovery monitoring config.) for receiving (monitoring) the identification information for identifying the MC 250, to the UE 100. The eNB 200 can transmit the monitor information to the UE 100, by the individual signaling.

The eNB 200 transmits the monitor information to the UE 100, in response to receipt of the interest indication. The UE 100 receives the monitor information from the eNB 200, in response to the transmission of the interest indication.

The monitor information is, for example, information for applying to the UE 100 setting (configuration) for receiving (monitoring) the identification information transmitted, in the sidelink, from the link MC 250.

The monitor information may include, for example, information for setting to the UE 100 a parameter for identifying, at an RAN level, the sidelink signal (for example, a discovery message) of the MC 250.

The monitor information may include, for example, information explicitly instructing a location of the radio resource in which the sidelink signal (for example, the discovery message) is transmitted. The information may be information indicating a reception resource pool (exclusively for receiving the discovery message from the mobile cell).

The monitor information may include, for example, a scrambling parameters for receiving the PSDCH from MC 250. The UE 100 can use the scrambling parameter included in the monitor information to decrypt the scrambled PSDCH. The MC 250 can transmit, by the PSDCH, the radio signal in the sidelink described later. It is noted that the scrambling parameter may be fixed with 510 (with cinit=510).

The monitor information may include, for example, identification information to be distinguished from another information. The identification information may be included in the MAC header. The Identification information may indicate the monitor information for receiving the sidelink signal from the MC 250 or information for receiving the sidelink signal from the UE 100 (for example, monitor resource information).

The monitor information may instruct a window for receiving (monitoring) the radio signal in the sidelink from the MC 250.

In step S103, the MC 250 transmits a special synchronization signal in the sidelink. In the present embodiment, the special synchronization signal is a synchronization signal transmitted in the sidelink. The UE 100 receives the special synchronization signal from the MC 250 (communication device). The UE 100 establishes synchronization with the MC 250 (communication device), based on the special synchronization signal.

The special synchronization signal is a sidelink synchronization signals (SLSS) transmitted via the PSBCH. The SLSS is comprised of a primary sidelink synchronization signal (PSSS) and a secondary sidelink synchronization signal (SSSS). The MC 250 may transmit, together with the special synchronization signal, MIB-SL (MasterInformationBlock-SL) transmitted in the sidelink. The MC 250 may transmit the special synchronization signal only without transmitting the MIB-SL. The MIB-SL may include information of at least any one of directFrameNumber, directSubframeNumber, or inCoverage. The directFrameNumber indicates a frame number in which the SLSS and the SL-BCH (broadcast channel for the sidelink) is transmitted. The subframe in a frame corresponding to the directFrameNumber is indicated by the directSubframeNumber. In the inCoverage, a true value indicates that a transmission source from which the MIB-SL is transmitted is within an E-UTRAN coverage. In the inCoverage, a false value indicates that a transmission source from which the MIB-SL is transmitted is outside the E-UTRAN coverage.

The MC 250 may transmit the special synchronization signal in each Discovery period. The Discovery period is a period provided for transmission/reception of the discovery message. The Discovery period may be a period to which the radio resource for transmission/reception of the discovery message is assigned (arranged).

Further, the MC 250 may start the transmission of the special synchronization signal, based on an instruction from the eNB 200. If receiving the interest indication from the UE 100, the eNB 200 may transmit an instruction to start the transmission of the special synchronization signal to the MC 250 (communication device).

Further, the MC 250 may include a special SLSS identifier (SLSS ID) not usable by a general cell (and the UE 100), into the special synchronization signal. The special SLSS identifier is an identifier for identifying the moving cell. If receiving the special synchronization signal including the special SLSS identifier, the UE 100 may determine that the transmission source of the special synchronization signal is transmitted is the MC (moving cell). For example, the MC 250 may use, as the special SLSS identifier, the SLSS identifier indicating any one of from 168 to 335, which is a value not used by the UE 100 existing in the cell for the SLSS identifier. In this case, in order that the UE 100 is notified that the transmission source of the (special) synchronization signal is the moving cell, the MC 250 may set that the inCoverage included in the MIB-SL is true value, along with the use of the special SLSS identifier. If the received synchronization signal (special synchronization signal) includes the special SLSS identifier, and the inCoverage indicates the true value, the UE 100 may determine that the transmission source of the received synchronization signal (special synchronization signal) is the MC (moving cell).

The UE 100 establishes the synchronization with the MC 250, based on the synchronization signal from the MC 250. The UE 100 may attempt the reception, according to the monitor information, based on the window instructed from the eNB 200. The UE 100 can obtain the SFN (system frame number) and/or the subframe, based on the MIB-SL from the MC 250.

In step S104, the MC 250 transmits, in the sidelink, the identification information for identifying the MC 250. The UE 100 receives, in the sidelink, the identification information.

The identification information includes, for example, a cell identifier for identifying the moving cell. The cell identifier may be a physical layer cell identifier (PCI: Physical-layer Cell-Identity). The cell identifier may be a cell global identifier (CGI: Cell Global Identity). The identification information is used to control a measurement on the radio signal from the MC 250 (UE-to-MC radio measurement).

The MC 250 can transmit the identification information by a discovery announcement, for example. The MC 250 may transmit the identification information for each Discovery period. Further, the MC 250 may start, based on an instruction from the eNB 200, the transmission of the identification information. If receiving the interest indication from the UE 100, the eNB 200 may transmit an instruction for starting the transmission of the identification information to the MC 250 (communication device).

It is noted that the UE 100 may receive (obtain) the identification information, based on a sequence of the synchronization signal in a case where the MIB-SL is not transmitted.

In step S105, the UE 100 reports the received identification information to the eNB 200. The eNB 200 receives the identification information from the UE 100. The identification information may include not only the PCI but also the CGI.

In step S106, the eNB 200 transmits configuration information to measure a reference signal from the MC 250, to UE 100. The eNB 200 can transmit, based on the identification information, the configuration information to the UE 100 by the individual signaling (for example, an RRC reconfiguration message). The UE 100 receives, in response to the transmission of the identification information, the configuration information from the eNB 200.

If transmitting the configuration information to the UE 100, the eNB 200 sets the setting for measuring the reference signal from the MC 250, to UE 100. The UE 100 is provided with the setting from for measuring the reference signal from the MC 250.

The eNB 200 may transmit the configuration information for measuring the reference signal from the MC 250 identified by the identification information, to the UE 100. Alternatively, the eNB 200 may transmit common configuration information with which even a reference signal from another MC can be measured, to the UE 100.

The eNB 200 may transmit the configuration information to the UE 100 only if receiving the identification information from the UE 100. In this case, at the initiative of the UE 100, the measurement setting for the MC can be set to the UE 100. As a result, the eNB 200 will not need to execute the RRC reconfiguration for configuring the measurement of the MC every time the MC enters and leaves from the cell of the eNB 200. Further, the eNB 200 needs not execute the RRC reconfiguration for configuring the measurement of the MC, on all the UEs within its own cell. As a result, if the coverage of the MC is narrow (for example, if the MC is operated at 5 GHz), for example, the eNB 200 can effectively execute the RRC reconfiguration for configuring the measurement of the MC. Further, the eNB 200 can execute the RRC reconfiguration for configuring the measurement of the MC, without managing the position of the moving MC.

In step S107, the UE 100 measures, based on the configuration information, the reference signal from the MC 250. The UE 100 controls, based on the identification information, measurement on the radio signal from the MC 250 (UE-to-MC radio measurement). Specifically, the UE 100 identifies the radio signal from the MC 250, by the identification information. The UE 100 executes the measurement on the identified radio signal.

The UE 100 can measure the reference signal in the downlink from the MC 250, for example. Specifically, UE 100 can measure a reception level (received strength (RSRP: Reference Signal Receive Power) and/or reception quality (RSRQ: Reference Signal Received Quality)) of a cell-specific reference signal (CRS), or a reference signal for tracking (TRS: Tracking Reference Signal) from the MC 250.

Further, The UE 100 can measure the radio signal in the sidelink from the MC 250, for example. Specifically, the UE 100 can measure the reception level (received strength and/or reception quality) of the sidelink signal from the MC 250. For example, the UE 100 may measure the reception level (the received strength (S-RSRP) and the reception quality (S-RSRQ)) of the reference signal in an RB (resource block) in which the PSBCH is transmitted. Further, the UE 100 may measure the reception level (the received strength (SD-RSRP) and the reception quality (SD-RSRQ)) of the reference signal in the RB in which the PSDCH is transmitted.

The MC 250 (communication device) can transmit at least any one of the cell-specific reference signals, the reference signal for tracking, or the sidelink reference signal.

In step S108, the UE 100 transmits (reports) a measurement result of the reference signal from the MC 250 to the eNB 200. The UE 100 can transmit the measurement result of the reference signal in the downlink and/or the reference signal in the sidelink, to the eNB 200. The eNB 200 receives the measurement result of the reference signal from the MC 250, from the UE 100.

The eNB 200 determines, based on the measurement result, whether to perform handover of the UE 100 to the MC 250. If the reception level of the reference signal from the MC 250 is equal to or more than a threshold value, the eNB 200 may determine to perform handover of the UE 100 to the MC 250. If the reception level of the reference signal from the MC 250 is less than a threshold value, the eNB 200 may determine not to perform handover of the UE 100 to the MC 250.

If performing handover of the UE 100 to the MC 250, the eNB 200 executes a process of step S109.

In step S109, the eNB 200 executes the handover process to perform handover of the UE 100 to the MC 250. For example, the eNB 200 transmits a handover request to the MC 250 (communication device). If receiving a handover request ACK from the MC 250, the eNB 200 transmits a handover command to perform the handover from the UE 100 to the MC 250. If receiving the handover command, the UE 100 executes a control for establishing the RRC connection with the MC 250 (communication device). The MC 250 (communication device) executes a control for establishing the RRC connection with the UE 100 that has received the identification information from the MC 250. Thereafter, the UE 100 and MC 250 can establish the RRC connection to start the communication.

It is noted that UE 100 recognizes the moving cell as a cell. On the other hand, if the UE 100 establishes a connection with another UE by the sidelink, the UE 100 recognizes the other UE as the UE. The UE 100 cannot establish the RRC connection with the other UE.

As described above, the MC 250 transmits, in the sidelink, the identification information for identifying the MC. The UE 100 receives, in the sidelink, the identification information. The UE 100 obtains the identification information for identifying the cell (moving cell), according to the different ways for a general cell. The UE 100 can identify the MC 250 by the identification information. Therefore, it is possible to suppress a situation where the UE 100 not wishing to connect to the MC 250 establishes the connection (RRC connection) between the UE 100 and the MC 250 (communication device) in the same way as in the case of the general cell. As a result, it is possible to reduce an unnecessary signaling between the UE 100 and MC.

Second Embodiment

Figure 9:
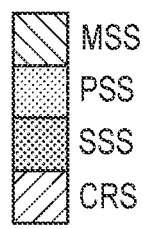
FIG. 9 is a diagram (Part 2) for explaining a special synchronization signal.
Figure 10:
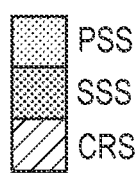
FIG. 10 is a diagram (Part 3) for explaining a special synchronization signal.
Figure 11:
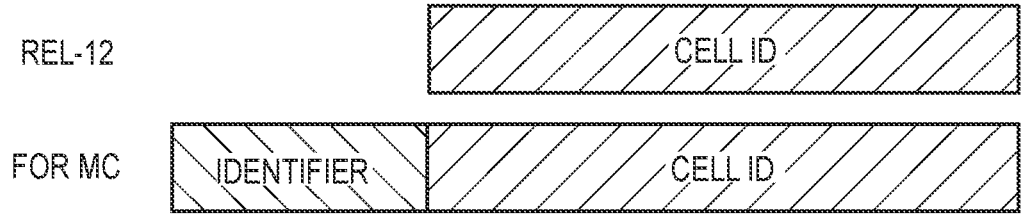
FIG. 11 is a diagram (Part 4) for explaining a special synchronization signal.
Figure 12:
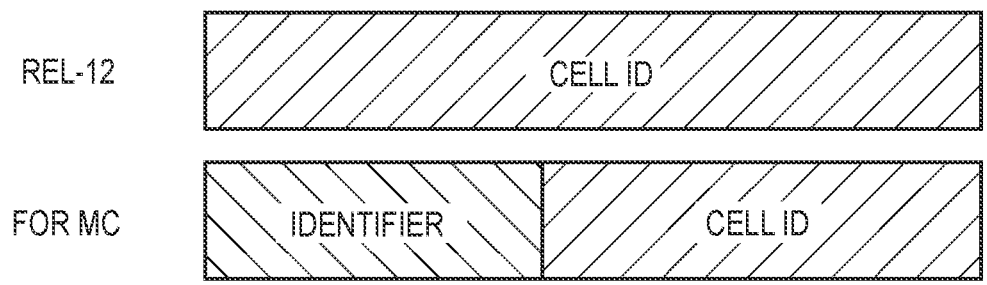
FIG. 12 is a diagram (Part 5) for explaining a special synchronization signal.

Next, a second embodiment will be described by using FIG. 7 to FIG. 12. FIG. 7 is a sequence chart for explaining an operation according to the second embodiment. FIG. 8 is a diagram (Part 1) for explaining the special synchronization signal. FIG. 9 is a diagram (Part 2) for explaining the special synchronization signal. FIG. 10 is a diagram (Part 3) for explaining the special synchronization signal. FIG. 11 is a diagram (Part 4) for explaining the special synchronization signal. FIG. 12 is a diagram (Part 5) for explaining the special synchronization signal.

In the second embodiment, a case is described where the MC 250 (communication device) transmits the special synchronization signal according to a manner different from that for transmitting the synchronization signal in the downlink. It is noted that a description similar to that above will be omitted as appropriate.

In FIG. 7, the MC 250 does not transmit the synchronization signal in the downlink, as in the first embodiment. Further, the MC 250 transmits neither the synchronization signal (PSS/SSS) nor the CRS. The MC 250 does not transmit the PSS/SSS/CRS at least in the Rel-8.

Steps S201 to S202 correspond to steps S101 to S102.

The monitor information is information for receiving the radio signals in step S203 (for example, information explicitly instructing a position of the radio resource).

In step S203, the MC 250 transmits, in the sidelink, the identification information for identifying the MC 250. Step S203 corresponds to step S104.

The MC 250 may transmit, together with the identification information (PCI, CGI, or the like), the configuration information for receiving the special synchronization signal (Moving cell DRS config.). The special synchronization signal is transmitted by a manner different from that for the transmission of the synchronization signal in the downlink (PSS/SSS). The UE 100 can receive, based on the configuration information, the special synchronization signal. The configuration information may be information for the MC 250 to designate a manner of transmitting the MC-DRS described above.

In step S204, the MC 250 transmits the special synchronization signal. The special synchronization signal is a discovery reference signal dedicated to the MC 250 (Moving cell MC-DRS: Moving cell Discovery Reference Signal).

The MC 250 transmits the MC-DRS by at least any one of the following manners.

Firstly, the MC 250 transmits the MC-DRS by a transmission pattern different for the synchronization signals (and the DRS) transmitted in the general cell.

Figure 8A:
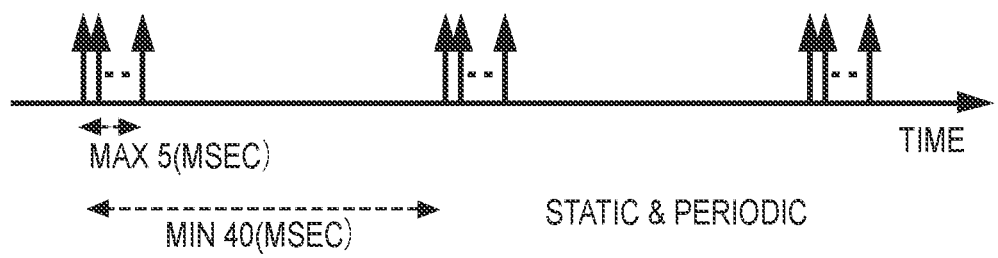
FIG. 8 is a diagram (Part 1) for explaining a special synchronization signal.
Figure 8B:
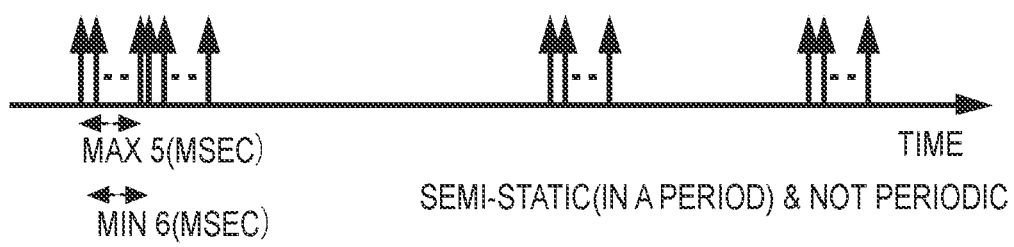

As illustrated in FIG. 8A, in the general cell, the DRS is transmitted statically and periodically. Specifically, a maximum value of one period for transmitting the DRS is 5 msec, and a minimum value of an interval of the transmission period is 40 msec. On the other hand, as illustrated in FIG. 8B, in the moving cell, the MC-DRS is transmitted statically and non-periodically. For example, the maximum value of one period for transmitting the DRS may be switched between 5 msec and 6 msec. The minimum value of the interval of the MC-DRS transmission period may be non-periodic.

The MC 250 may transmit the MC-DRS by the transmission pattern complying with the instruction from the eNB 200. Further, the MC 250 may autonomously select the transmission pattern from a plurality of transmission pattern candidates. The plurality of transmission pattern candidates may be provided to the MC 250 from the eNB 200.

Secondly, the MC 250 transmits the MC-DRS configured by the synchronization signal that can be used only by the MC (MSS: Moving Cell specific Synchronization Signal) (see FIG. 9). Once designating the MSS, the UE 100 can uniquely designate a sequence number of an orthogonal code sequence (Zadoff-Chu sequence).

An interval (offset) between the PSS/SSS and the MSS may be or may not be fixed. If the offset is not fixed, the UE 100 may be notified of the offset by the configuration information from the MC 250.

It is noted that if the MC 250 can transmit the PSS/SSS/CRS (and channel-state-information reference signal (CSI-RS: Channel State Information RS)), a combination between the PSS/SSS/CRS (and the CSI-RS) and the MSS may be defined as the MC-DRS.

Thirdly, the MC 250 arranges the synchronization signal (PSS/SSS) in a place different from the place of the PSS/SSS transmitted by the general cell (see FIG. 10).

For example, the interval (offset) between the PSS and the SSS is changed. The UE 100 may be notified of the offset by the configuration information from the MC 250. The UE 100 may be notified of the offset from the eNB 200. The offset may indicate an MNC (Mobile Network Code).

It is noted that the MC 250 may utilize, as the cell identifier (PCI) included in the MC-DRS, an identifier different from an existing identifier. As a result, it is possible to further identify from which MCS the transmitted MC-DRS is transmitted.

For example, by extending a value that the SSS may take, a new PCI is retained (see FIG. 11). The extended value is a predetermined identifier. The predetermined identifier is, for example, an operator identifier.

Further, by reserving for the MC a part of the value that the SSS may take, a part of the existing PCI is retained for the MC (see FIG. 12). The reserved value is a predetermined identifier. The predetermined identifier is, for example, an operator identifier.

Even if the cell ID portion of FIG. 11 or FIG. 12 is the same, if a predetermined identifier portion is different, the UE 100 can identify the MC from which the MC-DRS is transmitted.

The UE 100 establishes the synchronization with the MC 250, based on the MC-DRS.

Steps S205 to S208 correspond to steps S105 to S108. UE 100 in step S205, the UE 100 may transmit not only the identification information but also the configuration information (for example, the transmission pattern of the MC-DRS) in step S203, to the eNB 200.

It is noted that after step S208, a process similar to that in step S109 may be executed.

Third Embodiment

Next, a third embodiment will be described by using FIG. 13. FIG. 13 is a sequence diagram for describing an operation according to the third embodiment.

In the third embodiment, if the MC 250 is a cell accessible by the UE 100, the UE 100 transmits the interest indication, to the eNB 200. It is noted that a description similar to that above will be omitted as appropriate.

In FIG. 13, steps S301 and S302 correspond to steps S101 and S102.

In step S303, the MC 250 transmits, in the sidelink, the identification information for identifying the MC 250. In the present embodiment, the identification information may include not only the PCI (and/or the CGI) but also any one of a CSG identifier (CSG ID) used for identifying a CSG (Closed Subscriber Group) within a PLMN (Public Land Mobile Network), or a tracking area identifier (TAI: Tracking Area Identity) for designating a tracking area.

In step S304, the UE 100 determines, based on the identification information, whether the UE 100 is accessible to the MC 250 or not. Specifically, if the CSG ID received from the MC 250 indicates the CSG to which the UE 100 belongs, that is, if the MC 250 is a CSG member, the UE 100 determines that the UE 100 is accessible to the MC 250. If the CSG ID received from the MC 250 does not indicate the CSG to which the UE 100 belongs, that is, if the MC 250 is not the CSG member, the UE 100 determines that the UE 100 cannot access the MC 250.

Only if determining that the UE 100 is accessible to the MC 250, the UE 100 executes a process of step S305. On the other hand, if the UE 100 determines that it is not possible to access the MC 250, the process is ended.

It is noted that the CSG cell is a cell accessible only by the UE 100 having an access right (referred to as "member UE")

Step S305 corresponds to step S105. The UE 100 transmits the identification information to the eNB 200. Here, the identification information may include not only the PCI (and/or CGI), but also at least one of the CSG ID and the TAI.

It is noted that the UE 100 can establish the synchronization with the MC 250, in accordance with a similar manner to that in the first embodiment or the second embodiment.

Steps S306 to S308 correspond to steps S106 to S108. It is noted that, in step S306, if not receiving system information (SI) of the MC 250 from the UE 100, the eNB 200 may request, to UE 100, the system information of the MC 250. In step S308, if the system information is requested from the eNB 200, the UE 100 may report not only the measurement result of the reference signal from the MC 250, but also the CGI, the CSG ID, and the TAI, to the eNB 200.

As described above, only if the UE 100 is accessible to the MC 250, the UE 100 transmits the interest indication to the eNB 200. Thus, if the UE 100 is inaccessible to the MC 250, the interest indication is not transmitted, thereby reducing an unnecessary signaling.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

For example, in the embodiments described above, the UE 100 transmits the interest indication to the eNB 200; however, this is not limiting. The UE 100 do not always need to transmit the interest indication, to the eNB 200. The UE 100 may receive (monitor) the identification information and/or the special synchronization signal from the MC 250, without transmitting the interest indication.

Further, in each of the embodiments described above, the UE 100 may transmit, to the eNB 200, an indication to indicate that the UE 100 is no longer interested in connecting to the MC 250. If the UE 100 is no longer interested in connecting to the MC 250, the UE 100 may transmit the indication to the eNB 200. The UE 100 may include an intention that the UE 100 is no longer interested in connecting to the MC 250, into the indication. Further, if the UE 100 completes the connection to the MC 250, the UE 100 may transmit the indication to the eNB 200. The UE 100 may transmit the indication to the MC 250 instead of to the eNB 200. Alternatively, the UE 100 may transmit the indication to both the eNB 200 and the MC 250.

The eNB 200 receives the indication from the UE 100. If the UE 100 has performed a control to connect to the MC 250, the eNB 200 may cancel the control. For example, the eNB 200 may cancel the transmission of the configuration information for measuring the reference signal from the MC 250. The eNB 200 may stop the handover process to perform handover of the UE 100 to the MC 250. Further, if the UE 100 was performing a control to connect to the MC 250, the MC 250 receiving the indication may cancel the control. For example, the MC 250 may stop the handover process.

The operation according to each of the above-described embodiments may be combined to be executed, where necessary. Further, in each of the above-described sequences, all of the operations may not necessarily be essential configurations. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. Further, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which includes: a memory for storing a program for performing each process performed by any one of the UE 100 and the eNB 200; and a processor) for executing the program stored in the memory.

In the above-described embodiments, an LTE system is described as an example of the mobile communication system; however, the LTE system is not an exclusive example, and the content according to the present application may be applied to a system other than the LTE system.

The entire content of Japanese Patent Application No. 2016-012326 (filed on Jan. 26, 2016) is incorporated herein by reference.

INDUSTRIAL APPLICABILITY

The present invention is useful in the field of radio communication.

The invention claimed is:

1. A radio terminal, comprising:
   a receiver configured to receive from a moving cell, identification information identifying the moving cell, the moving cell being managed by a movable communication device, moving along movement of the communication device, and performing radio communication with the radio terminal while moving,
   a transmitter configured to transmit the identification information to a base station or not to transmit the identification information to the base station, based on the received identification information, and
   a controller, wherein
   the receiver is configured to receive the identification information via a sidelink that is a direct radio link in a proximity service,
   the receiver is configured to receive, from the moving cell, a special synchronization signal transmitted by a manner different from a manner for a synchronization signal in a downlink,
   the controller is configured to establish synchronization with the moving cell, based on the special synchronization signal,
   the special synchronization signal is an MC-DRS (Moving cell Discovery Reference Signal) dedicated to the moving cell,
   the controller is configured to identify, based on the special synchronization signal, that a transmission source cell transmitting the special synchronization signal is the moving cell, and
   the identification information includes at least one of a closed subscriber group (CSG) identifier for identifying a CSG within a public land mobile network (PLMN) and a tracking area identifier (TAI) for designating a tracking area.

2. The radio terminal according to claim 1, wherein the controller is configured to control a measurement on a radio signal from the moving cell, based on the identification information.

3. The radio terminal according to claim 1, wherein the receiver is configured to receive the special synchronization signal in the sidelink, from the moving cell.

4. The radio terminal according to claim 1, wherein the special synchronization signal is different in transmission pattern from the synchronization signal.

5. The radio terminal according to claim 1, wherein the transmitter is configured to transmit an indication indicating that the radio terminal is interested in connection to a moving cell, before receiving the identification information, to a base station configured to manage a serving cell of the radio terminal, and
the receiver is further configured to receive from the base station information for receiving the identification information in response to transmission of the indication.

6. The radio terminal according to claim 1, wherein the transmitter is configured to transmit the identification information to a base station configured to manage a serving cell of the radio terminal, and
the receiver is further configured to receive from the base station, in response to transmission of the identification information, configuration information for measuring a radio signal from the moving cell.

7. The radio terminal according to claim 6, wherein the controller is configured to measure a reference signal from the moving cell, based on the configuration information,
the transmitter is configured to transmit a measurement result of the reference signal to the base station, and
the reference signal is a reference signal in the downlink or a reference signal in the sidelink.

8. The radio terminal according to claim 1, wherein the transmitter is configured to transmit an indication indicating that the radio terminal is interested in connection to a moving cell, before receiving the identification information, to a base station configured to manage a serving cell of the radio terminal, and
the transmitter is configured to transmit the indication only if the radio terminal is accessible to the moving cell.

9. The radio terminal according to claim 3, wherein the special synchronization signal in the sidelink includes a Sidelink Synchronization Signal (SLSS) identifier.

* * * * *